April 7, 1970   H. S. WITTEVEEN   3,505,122
BATTERY EJECTOR IN BATTERY-POWERED APPARATUS
Filed Sept. 22, 1967
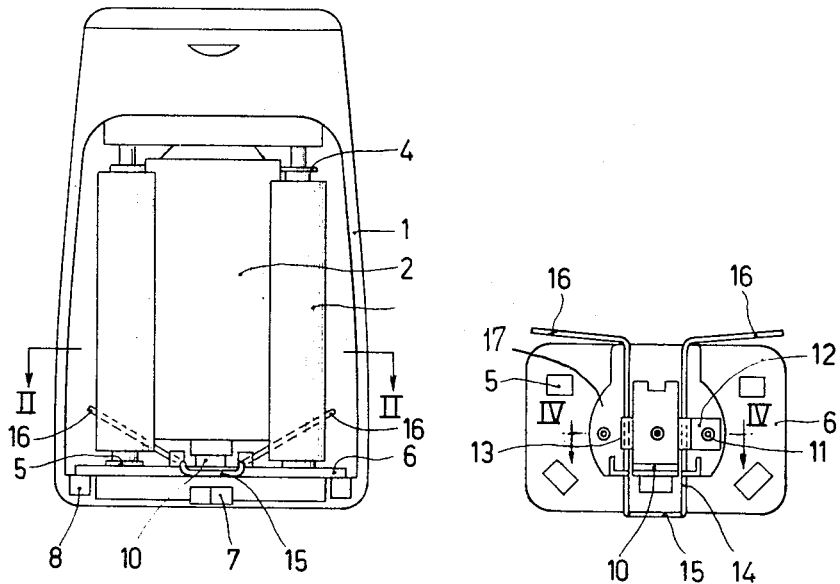
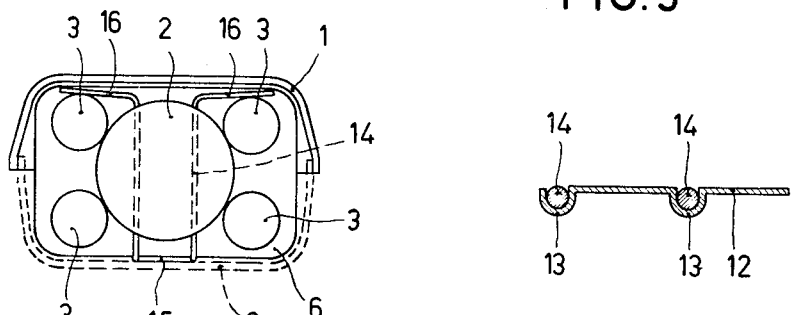
INVENTOR.
HAYE S. WITTEVEEN
BY
AGENT United States Patent Office 3,505,122
Patented Apr. 7, 1970

3,505,122
BATTERY EJECTOR IN BATTERY-POWERED APPARATUS
Haye Sibbele Witteveen, Gorredijk, Netherlands, assignor, by mesne assignments, to U.S. Philips Corporation, New York, N.Y., a corporation of Delaware
Filed Sept. 22, 1967, Ser. No. 669,930
Claims priority, application Netherlands, Sept. 23, 1966, 6613435
Int. Cl. H01m 1/04
U.S. Cl. 136—173                    4 Claims

ABSTRACT OF THE DISCLOSURE

An ejector for removing batteries in a battery-powered apparatus, the ejector being slidable in a guide and having arm parts for engaging and moving the batteries toward an opening in the apparatus casing.

---

This invention relates to an apparatus preferably powered by cylindrical-shaped batteries, more particularly a battery-powered dry shaving apparatus, in which at least one battery is enclosed in a casing provided with a removable lid.

Such apparatus are known and in use in large quantities. After a certain period of time the batteries become exhausted and must then be recharged or removed from the apparatus and replaced. More particularly with apparatus in which four cylindrical-shaped dry batteries are used, this removal may be difficult because in connection with the desired compact construction, the batteries are difficult to grip. Also with other battery-powered apparatus, such as certain kinds of electric resistance meters and flashlight apparatus, where it is difficult to build in special gripping parts, removing batteries involves further difficulties.

According to the present invention this problem is now solved in that an apparatus as described above includes a device which is directly or indirectly connected to the casing and has one or more arms which are situated under one or more batteries on the side of the casing, the device being movable in a direction approximately perpendicular to the batteries. By moving of the device the batteries are released from their holders, if any, and pushed out of the casing so that exchanging is a simple matter.

In one embodiment of the invention in which the apparatus is a known dry shaving apparatus which is powered by four cylindrical-shaped batteries and is provided with a contact plate arranged perpendicularly to the longitudinal direction of the batteries in the casing, said apparatus is characterized in that the device slidably fixed to the contact plate. A simple fixation for the device is thus obtained.

A further embodiment of the invention is characterized in that the device comprises two rods which are connected by a transverse part at one of their ends, each rod having an arm at its other end and being capable of sliding through a guide which is fixed to the contact plate, the transverse part projecting above the contact plate. The device can thus be bent from a round wire and hence it can be cheap, while the attachment of the device to the plate is also simple and can be effected in a cheap manner.

In order that the invention may be readily carried into effect, an embodiment thereof will now be described in detail, by way of example, with reference to the accompanying diagrammatic drawing, in which:

FIGURE 1 is a top plan view of a battery-powered dry shaving apparatus with the lid removed;
FIGURE 2 is a cross-section taken along the line II—II of the FIGURE 1 viewed in the direction of the arrow;
FIGURE 3 is a elevation view of a contact plate of the apparatus of FIGURE 1; and
FIGURE 4 is a cross-section of a part of FIGURE 3, taken along the line IV—IV and viewed in the direction of the arrow.

FIGURES 1 and 2 show a casing 1 containing in its upper part shear heads with cutters which are not shown. These cutters are driven by a diagrammatically shown D.C. motor 2, which is powered by four cylindrical-shaped batteries 3 the motor and batteries being situated in a chamber in the lower part of the casing. These batteries are enclosed between spring contacts 4 and contacts 5 which are situated on a contact plate 6 made of synthetic material. In addition said contact plate has a switch 7, which is not shown, and is clamped in the casing; springs 8 support the side of the plate 6 remote from the motor 2 and these springs also hold the lid 9 which is shown by a broken line in FIGURE 2. Furthermore the contact plate has also a spring 10 on the side of the motor which spring engages the motor and clamps it in the casing. When the batteries are exhausted the upper two batteries can be removed from the casing in a simple manner; however, the lower two are difficult to grip without auxiliary means.

The contact plate 6 carries a plate 12 which is fixed by flanged sleeves 11, the plate having two semi-circular channels 13. Each of these channels 13 accommodates a rod 14 which rods have body parts connected by a transverse or handle part 15 at one of their ends, and have an oblique arm 16 at their other remote ends. The rods 14 are slidable in the channels 13, the arms 16 being situated in the position shown in FIGURE 1 under the two lower batteries 3. In addition the rods 14 are guided by cams 17 on the contact plate. If the transverse part 15 is pulled into a direction perpendicular to the longitudinal direction of the apparatus then the arms 16 push the batteries upwards so that they can easily be removed from the apparatus.

It will be evident that it is also possible to use the device shown when using only one battery or when using batteries having flat or other shapes. Furthermore small rechargeable accumulators are also useable with the device described. The device can be used advantageously in other apparatus such as electric resistance meters and flashlight apparatus, where access to the batteries is difficult.

What is claimed is:

1. In a battery-powered apparatus including a casing having an opening and a chamber therein, and holding means including a contact plate releasably restraining at least one battery in said chamber, a battery-ejector in combination therewith, comprising, a guide on said contact plate, and at least one rod having (i) a body part slidably engaged to said guide, (ii) a remote arm disposed in said chamber, and (iii) a handle part near said opening, the rod being movable whereby its remote arm disposed in said chamber provides means for contacting and releasing a battery therein from said holding means and moving the battery toward said opening.

2. Apparatus as defined in claim 1 wherein said chamber has a longitudinal axis for accommodating batteries orientable to have their longitudinal axis parallel to the chamber axis, the rod being disposed and movable in a direction substantially normal to the axis of said chamber.

3. Apparatus as defined in claim 1 further comprising a second rod having a body part slidably engaged to said guide, a remote arm disposed in said chamber and a transverse part connecting the two rods near said opening forming said handle part.

4. Apparatus as defined in claim 3 wherein said arms extend at an angle from said contact plate.

References Cited

UNITED STATES PATENTS 2,589,071  3/1952  Galasso _____ 136—173.12

OTHER REFERENCES

German printed application 1,128,896, Kwiatkowski, published May 3, 1962.

WINSTON A. DOUGLAS, Primary Examiner

D. L. WALTON, Assistant Examiner